United States Patent [19]

Starner et al.

[11] Patent Number: 4,724,256
[45] Date of Patent: Feb. 9, 1988

[54] URETHANE LINKED HYDROXY AROMATIC ISOCYANATES

[75] Inventors: William E. Starner, Freeland; Barton Milligan, Coplay; Roland E. Grandin, Alburtis, all of Pa.

[73] Assignee: Air Products and Chemicals, Inc., Allentown, Pa.

[21] Appl. No.: 2,840

[22] Filed: Jan. 13, 1987

[51] Int. Cl.$^4$ .............................................. C08G 18/30
[52] U.S. Cl. ...................................... 528/76; 528/85; 560/24; 560/29; 560/30; 558/418
[58] Field of Search ...................... 528/85, 76; 560/24, 560/29, 30; 558/418

[56] References Cited

U.S. PATENT DOCUMENTS

| | | | |
|---|---|---|---|
| 2,969,386 | 1/1961 | McElroy | 560/26 |
| 3,020,249 | 2/1962 | Curtis | 521/118 |
| 3,023,228 | 2/1962 | Wagner et al. | 560/32 |
| 3,076,770 | 9/1958 | Saunders et al. | 521/130 |
| 3,218,348 | 11/1965 | McElroy et al. | 560/26 |
| 3,285,981 | 11/1966 | MacLean et al. | 570/257 |

Primary Examiner—Maurice J. Welsh
Assistant Examiner—Sam A. Acquah
Attorney, Agent, or Firm—Russell L. Brewer; James C. Simmons; William F. Marsh

[57] ABSTRACT

This invention relates to urethane linked hydroxy aromatic isocyanates and to a process for producing such urethane linked hydroxy aromatic isocyanates. The compositions are formed by reacting one equivalent aromatic diisocyanate with one equivalent of an alkylene polyol under conditions such that only one of the isocyanate groups react with the hydroxyl group of the polyol. Conditions are controlled such that the urethane linked hydroxy aromatic isocyanates are formed. The resulting product is suited for producing a variety of elastomers including a one component polyurethane elastomer.

24 Claims, No Drawings

4,724,256

URETHANE LINKED HYDROXY AROMATIC ISOCYANATES

TECHNICAL FIELD

This invention relates a process for producing monohydroxy aromatic monoisocyanate or alternatively a urethane linked hydroxy aromatic isocyanate.

BACKGROUND OF THE INVENTION

Mononuclear aromatic polyisocyanates are well known and are widely used in the preparation of polyurethane and polyurethane/urea elastomers. These mononuclear aromatic diisocyanates generally include compositions such as toluenediisocyanate, phenylenediisocyanate, chlorotoluenediisocyanate and the like. In the preparation of polyurethane and polyurea elastomers, the aromatic diisocyanates are reacted with a long chain polyol to produce a prepolymer which then may be further reacted with a short chain polyol or aromatic diamine to form a polyurethane or polyurethane/urea elastomer. Long chain polyols, e.g. those having a molecular weight of above 700, are generally utilized to form the prepolymer and the chain extender usually as stated, is a short chain polyol, e.g., $C_2$-$C_{10}$ glycol, or an aromatic diamine. The long chain polyol provides flexibility and elastomeric properties to the resin, while the short chain polyol or aromatic diamine provides short chain segments to cross-link and add toughness and rigidity to the resulting resin.

A major problem with mononuclear aromatic diisocyanates is that they are toxic and because of their low molecular weight, tend to be quite volatile. Because of their toxicity and volatility, extreme care must be taken in the work place to avoid inhalation and damage to the respiratory tract and contact with the skin. There is some literature on the subject of reacting aromatic diisocyanates, particularly toluene diisocyanate, with short chain polyols to increase their molecular weight and reduce volatility and the utilization of these polyol extended aromatic diisocyanates in the formation of polyurethanes. Representative literature is noted in the following articles.

U.S. Pat. No. 2,969,386, German Pat. Nos. 756,058 and 870,400 show a method of producing organic polyisocyanates, and particularly urethane polyisocyanates, by reacting an aromatic diisocyanate with a polyol, such as ethylene glycol. However, as the '386 patent noted, there was a problem in that side reactions occurred and lead to the formation of polymeric products which contained free unreacted diisocyanate; in other words the process produced a mixture of compounds. The '386 patent attempted to solve the problem associated with the '058 and '400 patents by producing urethane polyisocyanates having free isocyanate contents of 13-18% but substantially devoid of unreacted diisocyanate. Such result was achieved by carrying out the following steps (a) reacting the organic diisocyanate with polyol in an amount in excess over that stoichiometrically required, e.g., greater than a 2:1 molar ratio at a temperature above the melting point of the mixture but low enough, i.e., below 100° C., to avoid undesirable polymerization reactions; b) extracting the resin from the reaction mixture by contacting it with an aliphatic or acyclic hydrocarbon and c) separating the solvent layer which contains unreacted diisocyanate and polyol. By this technique one was able to obtain higher molecular weight urethane linked aromatic diisocyanates from the product layer.

U.S. Pat. No. 3,285,981 discloses reaction products of toluenediisocyanate and 2,3-butanediol, with the mole ratio of toluenediisocyanate to butanediol being at least 2:1, i.e., an NCO to OH ratio of at least 2:1 preferably 2-4:1. The product as prepared by dissolving toluenediisocyanate in a suitable solvent such as hexane and then adding butanediol to the solution. A solid white powder having a free NCO content of about 16% precipitated. The precipitate then was reacted with a milleable gum of polypropylene glycol, butanediol and toluenediisocyanate.

U.S. Pat. No. 3,218,348 discloses the preparation of a urethane polyisocyanate by the sequential reaction of a polyisocyanate e.g., toluenediisocyanate with a triol and then a diol. The patentees noted that when the procedure set forth in the '696 patent dsscribed above was carried out adding the diol and, then the triol or simultaneously adding the diol or triol to the isocyanate that the reaction product was unstable and would crystallize within a matter of minutes or days.

U.S. Pat. No. 3,076,770 discloses a Process for producing polyurethane foams by the reaction of an organic polyisocyanate with short chain polyols, utilizing the sequential addition of a triol and diol as in U.S. Pat. No. 3,218,348. The cellular polyurethane was prepared by removing free isocyanate from the reaction product and then reacting that with a polyester polyol to form the polyurethane.

U.S. Pat. No. 3,020,249 discloses a process for preparing polyurethane foams from an alkyd polyester resin and a reaction product of toluenediisocyanate and 1,2,6-hexanetriol. The hexanetriol-TDI adduct was formed by reacting toluenediisocyanate with the hexanetriol at temperatures of 100°-120° C., the toluenediisocyanate being included in substantial excess.

U.S. Pat. No. 3,023,228 discloses a process for producing urethane polyisocyanate urea systems by reacting a diisocyanate e.g., toluenediisocyanate with a short chain diol e.g. butanediol in the presence of a solvent, e.g., acetonitrile. Temperatures from about 10°-35° C. are suggested as being suited for forming the reaction product. Examples show reacting toluenediisocyanate with ethylene glycol or diethylene glycol in the presence of water and acetone for one to two hours at which time the reaction mixture solidifies and a crystal magma forms. The resulting low molecular weight products are valuable as reactants in the production of polyurethane plastics.

SUMMARY OF THE INVENTION

This invention relates to a process for producing urethane linked hydroxy aromatic isocyanates by the reaction of a hindered aromatic diisocyanate with an aliphatic polyol. The reaction is carried out in the presence of a solvent at a temperature and for a time sufficient to effect reaction of one isocyanate but insufficient to effect reaction of the second isocyanate group on the aromatic ring. The reaction product is then isolated from the reaction medium and has the general formula:

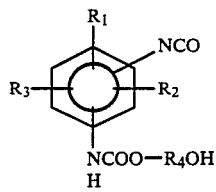

$R_1$ is $C_{1-6}$ aliphatic, $C_{1-6}$ aliphatic ether or $C_{1-6}$ carboxylic acid ester;

$R_2$ and $R_3$ are hydrogen, $C_{1-6}$ aliphatic, $C_2–C_6$ olefinic, $C_{1-6}$ carboxylic acid ester, $C_{1-6}$ aliphatic ether, CN, and halogen and $R_4$ is aliphatic.

The urethane linked hydroxy aromatic isocyanates are unique and provide multiple advantages in elastomer synthesis. These advantages include:

the inclusion of highly reactive functional groups, i.e., an isocyanate group and a hydroxy group which provides a mechanism for producing crosslinked polyurethane and polyurethane/urea elastomers;

an ability to produce unique polyurethane/urea elastomers by virtue of the ability to substitute the urethane linked hydroxyisocyanate for either the isocyanate providing component or polyol component on a 1:1 equivalent basis;

an ability to control the hard segments and soft segments in a polyurethane/urea elastomer thereby permitting one to produce a variety of elastomers having different elastomeric properties;

an ability to form a reaction product that provides a relatively uniform isocyanate content per unit weight of product; and an ability to form a reaction product substantially free of unreacted isocyanate and free of dimers and oligomers.

DETAILED DESCRIPTION OF THE INVENTION

In the practice of this invention an aromatic diisocyanate is reacted with a polyol to form a hydroxy aromatic isocyanate. The aromatic diisocyanates suited for practicing the invention are represented by the formula:

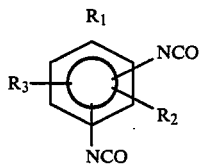

$R_1$ is $C_{1-6}$ aliphatic, $C_{1-6}$ aliphatic ether or $C_{1-6}$ carboxylic acid ester;

$R_2$ and $R_3$ are hydrogen, $C_{1-6}$ aliphatic, $C_2–C_6$ olefinic, $C_{1-6}$ carboxylic acid ester, $C_{1-6}$ aliphatic ether, CN and halogen. Usually $R_1$ is $C_1$ methyl and $R_2$ and $R_3$ are hydrogen although $R_2$ and $R_3$ may be $C_{1-6}$ alkyl or other group. Typically there is only one and not more than two substituents pendant from the mononuclear aromatic diisocyanate.

Representative organic diisocyanates include toluenediisocyanate, which includes the two main isomers the 2,4- and the 2,6- diisocyanate and generally present in a weight % of 80% 2,4- and 20% 2,6. These aromatic diisocyanates may be substituted with a variety of components, provided they do not interfere with the reaction with polyol. Examples of substituents which can be substituted on the ring include halogen atoms, such as, iodine, bromine, chlorine, and fluorine; amide, ester, nitrile and other groups. Specific mononuclear aromatic diisocyanates suited for the reaction include 2,4- and 2,6-toluenediisocyanate, 1,3-dimethyl-2,4- and 2,6-benzenediisocyanate, chloro toluenediisocyanate, 3-isopropyl-2,6-toluenediisocyanate, 5-isopropyl-2,4-toluenediisocyanate, 5-tert-butyl-2,4-toluenediisocyanate, 3-tert-butyl-2,6-toluenediisocyanate, 1-methyl-3,5-diethyl-2,4- and 2,6-toluenediisocyanate, 5-cyclopentenyl-2,4-toluenediisocyanate, 3,-cyclopentenyl-2,6-toluenediisocyanate, 1,3,5-mesitylenediisocyanate, 1,3-diethyl-2,4- and 2,6-benzenediisocyanate, 5-cyclopentenyl-2,4-toluenediisocyanate, 3-cyclopentenyl-2,6-toluenediisocyanate and 3,5-dicyclopentenyl 2,4- and 2,6-toluenediisocyanate.

The other reactant used in the process of forming a urethane linked hydroxy aromatic isocyanate is an aliphatic polyol. Typically these are those diols or triols that have from about 2 to 10 carbon atoms, preferably 2–6 carbon atoms. Glycols such as ethylene glycol, diethylene glycol, 1,3-butylene glycol, 1,3-propane diol, 1,2-propane diol, 1,2-butane diol, 1,4-butane diol, 1,2-pentane diol, 1,5-pentane diol, 1,4-hexane diol, 1,6-hexane diol and 2-butene-1,4-diol, glycerol, penterythritol are representative of the polyols that can be reacted with the isocyanate to produce the urethane linked hydroxy aromatic isocyanate compositions. One can also use long chain polyols, e.g., those having more than 10 carbon atoms, and particularly those polymeric polyols having molecular weights of at least 150 to about 1000 and above, to form common isocyanate prepolymers. Examples include polyether polyols such as polytetramethylene glycol (PTMG), polyethylene ether glycol, polypropylene ether glycol, and polycaprolactone triol.

Although not intending to be bound by theory, it is believed that the primary reason one can form the urethane linked hydroxy aromatic composition is that the reaction of a first isocyanate group in a substituted aromatic diisocyanate with a hydroxy group is relatively fast and that reaction of the second isocyanate group with a hydroxy group is relatively slow. Because of this difference in reactivity of the first isocyanate group and the second isocyanate group in the aromatic ring, one can terminate the reaction after formation of the urethane linked hydroxy aromatic isocyanate.

A second belief is that the reaction of an aromatic diisocyanate with a polyol, particularly a short chain polyol, permits the formation of a cyclic ring between the free hydroxyl and isocyanate groups and thereby form a stable intermediate. This belief is confirmed through diagrams based upon molecular mechanical modeling showing that a minimum energy level is observed in a urethane linked hydroxy aromatic composition when the short chain diol is cyclized between the one isocyanate group to the other with a terminal hydrogen atom pointing directly to the second isocyanate group.

A third belief is that the terminal hydroxy group in a urethane linked hydroxy aromatic isocyanate is less reactive than the hydroxy group in unreacted polyol, e.g., aliphatic diol. Therefore, the reaction of the terminal hydroxyl group with a first isocyanate group on an aromatic diisocyanate does not proceed prior to reaction of a first hydroxyl group of the diol with a first isocyanate group. Because of the apparent reactivity differential between the first and second isocyanate group in the aromatic diisocyanate and the reactivity of the first hydroxy group in an aliphatic difunctional diol, as compared to a terminal hydroxyl group, in the urethane linked hydroxy aromatic, one can limit this reaction to one equivalent isocyanate to one equivalent hydroxyl thereby producing a urethane linked hydroxy aromatic isocyanate.

Even though there is an apparent difference in reactivity between the first and second isocyanate groups in an aromatic diisocyanate as defined and a difference in reactivity between the hydroxyl group of a polyol, as compared to the terminal hydroxy group in a urethane linked hydroxy aromatic isocyanate, the relative difference is not substantial and extreme care must be taken in order to prevent the reaction of the terminal hydroxy group with either a first or second isocyanate group in an aromatic diisocyanate to prevent the formation of oligomers. The ease in which the urethane linked aromatic isocyanate is formed is directly related to the reactivity of the isocyanate group itself and, in particular, those isocyanates where one of the isocyanates is blocked by a substituent having an electronegative group or some bulkiness to provide steric hindrance. Where such situation exists, one can more easily obtain the urethane linked aromatic hydroxy isocyanate.

Several criteria appear to be helpful in order to produce the urethane linked hydroxy aromatic isocyanate compositions; one is that the reaction be carried out in the presence of a solvent where at least the reactants and reaction products are soluble; and two, the reaction is carried out at a temperature sufficiently low such that only the first isocyanate group in the aromatic isocyanate reacts. The solvent aids in diluting the reactants and reaction product and by such dilution, minimizes the chance of reaction of the terminal hydroxyl group on the urethane linked hydroxy aromatic isocyanate with another isocyanate group. Solvents which can be used are those which the reactants and reaction product are soluble in but which do not interfere with the reaction between the difunctional aliphatic polyol and aromatic diisocyanate. Examples of solvents suited for practicing the process include acetone, dioxane, tetrahydrofuran, acetonitrile and so forth.

By and large, the major parameter influencing and permitting the formation of the urethane linked hydroxy aromatic isocyanate is temperature. Temperature may vary depending upon the reactivity of the aromatic diisocyanate utilized. For example, phenylene diisocyanate, which is unsubstituted, has about equal reactivity between the first and second isocyanate group and it may be more difficult to limit reactivity to a single isocyanate group than a substituted aromatic isocyanate, such as toluenediisocyanate. Toluene diisocyanate does have a sufficient difference in reactivity between the isocyanate groups, and although that reactivity difference is not substantial, it is sufficient to permit control of reaction through temperature. Chloro toluenediisocyanate or a tert-butyl toluenediisocyanate where the tert butyl group is ortho to an isocyanate group are compositions which also have a substantial reactivity difference between the first and second isocyanate group and slightly higher temperatures can be utilized in order to synthesize the urethane linked hydroxy aromatic derivative.

The temperature of reaction for preparing such hydroxy isocyanates typically is between about $-25°$ C. to $30°$ C., and preferably from about $5°$ to about $20°$ C. When the temperature of reaction is increased above the $30°$ C. level e.g. to about $50°-70°$ C., one may form substantial amounts of dimers and oligomers. The best temperature range for forming the urethane linked hydroxy aromatic isocyanate composition is that where the reaction between the first isocyanate group and a hydroxyl group of the polyol is relatively fast, while insufficient for effecting reaction between the terminal hydroxyl group on the urethane link to another isocyanate group. One of the simpler ways of determining this temperature range for a given reactant system requires monitoring of the reaction through high performance liquid chromotography (HPLC). Liquid chromotography permits one to identify intermediates as well as the reactants and higher molecular weight oligomers in the reaction product. By monitoring free isocyanate content of the reaction product, and the extent of dimer and oligomer formation, one can select an appropriate temperature, within a temperature range to permit synthesis of the intermediate in high yield and selectivity. Of course, as the temperature is increased within this particular range, one may form a product mix that will possibly contain some higher molecular weight dimers and oligomers. If dimer and oligomer content is excessive, the temperature or reaction time should be reduced to minimize oligomer production and maximize the production of intermediate.

The ratio of aromatic diisocyanate to polyol may vary over a wide range since the urethane linked hydroxy aromatic isocyanate is relatively stable in the presence of both reactants and reaction product. Therefore, a broad range, for example 0.2-5, equivalents isocyanate per equivalent hydroxyl group in the aromatic diisocyanate and aliphatic difunctional polyol, respectively, may be used. However, for purposes of facilitating separation of reactant from product, a reactant ratio closer to stoichiometric, e.g., 0.8-1.2 equivalents aromatic diisocyanate per equivalent aliphatic difunctional diol is utilized, and preferably the ratio is stoichiometric, i.e., 1:1. The stoichiometric ratio permits one to form the urethane linked hydroxy aromatic isocyanate and separate the reaction product for use without substantial processing and it also reduces the amount of oligomer formation. The reaction product can be recovered by distillation of the solvent or extracting the reaction product from the solution by contacting the reaction mixture with a solvent in which the reaction product is insoluble and the reactants are soluble. Hexane and other aliphatic hydrocarbons are suitable solvents for effecting this extraction. Thus, when the reaction mixture is contacted with hexane, the reaction product precipitates from the solution. If reactant ratios other than stoichiometric are used, generally additional processing is required to recover reactant from the solvent. This is usually done by distillation of the solvent to free reactant therefrom. For this reason, reactant equivalent ratios other than stoichiometric (1:1) are not preferred because of the additional processing required to produce the reaction product, and no significant enhancement in terms of yield of selectivity is achieved.

The reaction time used for effecting the reaction between the aromatic isocyanate and polyol is primarily dependent on temperature. Reaction times may range from a few minutes, e.g., 5 minutes to several hours, e.g., 24 hours. As previously noted though at high temperatures it may be difficult or impossible to limit reaction to a single equivalent on an isocyanate to a single hydroxyl on the polyol and thereby produce dimers and oligomers. At lower temperatures and at preferred stoichiometry the reaction will stop without dimer and oligomer formation. Reaction times may average from about 15 minutes to 3 hours.

The following examples are provided to illustrate various embodiments of the invention are not intended to restrict the scope thereof.

EXAMPLE 1

Preparation of Aromatic Hydroxy Isocyanate

To a clean, dry 1-liter 3-necked reaction flask equipped with a mechanical stirrer, condenser, thermometer, dropping funnel and nitrogen purge, was added 400 milliliters of acetone and 174 grams of an 80/20 mixture of 2,4- and 2,6- toluenediisocyanate (two equivalents TDI). The components were mixed and the temperature of the resulting solution reduced to 5° C. At that time, 90 grams of 1,4-butanediol (two equivalents BDO) were added dropwise over a one hour period. The temperature was maintained at 5° C. with constant agitation for three hours at 5° C. after all of the butanediol had been added. Samples were taken periodically during the reaction and monitored for dimer and oligomer formation. No dimer or trimer formation was noted. The product was isolated by vacuum distillation of the acetone at 5° C. and one millimeter pressure. The resulting product contained both hydroxyl and isocyanate function, as determined by infrared spectroscopy and NMR, and had a molecular weight of 265, as determined by mass spectroscopy and gel permeation chromatography. The molecular weight determination shows the 1:1 reaction product adduct of TDI and BDO.

When the reaction product was heated in the presence of a tin polyurethane catalyst, reaction occurred and a brittle polymer having a Shore D hardness of 75 was obtained. The polymerization of the reaction product conclusively showed that a one component composition existed and that it possessed sufficient hydroxyl and isocyanate groups (1:1) to produce the polymer. An insufficient number of hydroxyl and isocyanate groups would result in a soft polymer.

EXAMPLE II

Preparation of Aromatic Hydroxy Isocyanate and Subsequent Conversion to Amine

To a clean, dry one-liter reaction flask equipped as in Example I was added 400 ml of tetrahydrofuran and 174 gm of 20/80 mixed isomer toluenediisocyanate (2 equivalents). The temperature of the solution was reduced to 10° C. and maintained there while adding dropwise over a one hour period 90 gm of 1,4-butanediol (2 equivalents). The product analyzed as the hydroxybutyl toluene isocyanate. The solution containing hydroxybutyl toluene isocyanate was stirred for 3 hours at 10° C. followed by dropwise addition of a solution of 100 gm NaOH in 900 gm of H₂0. The resulting solution was stirred for 1 hour and neutralized to pH 7.0 with concentrated hydrochloric acid. After 1 hour of stirring, the aqueous phase separated from the organic layer and the organic layer collected. Volatiles were removed from the product by vacuum distillation yielding 224.6 gm of product which by mass spectroscopy had a molecular weight of 237 and by wet chemical methods had the properties below:

|  | Actual | Based on Proposed Structure |
|---|---|---|
| Total Amine MEQ/gm | 3.92 | 4.20 |
| Hydroxyl Number | 459 | 471 |

MEQ/gm refers to milliequivalents amine/gram of composition.

The above procedure and data shows that the composition hydrolyzed to the amine was the hydroxybutyl tolueneisocyanate. Any excess butanediol remaining in the reaction product was extracted when the aqueous layer was separated from the organic layer. Any residual toluenediisocyanate remaining in the reaction product would have been converted to toluenediamine and the total amine value would have been much higher than 3.92; toluenediamine has an MEQ/gm of 16.6.

EXAMPLE III

Preparation of Hydroxy Aromatic Isocyanate and Subsequent Conversion to Amine

To a clean, dry one-liter 3 necked reaction flash equipped by the procedure of Example 1 was added 400 gm of dry acetone and 174 gm of 20/80 mixed isomer toluenediisocyanate (2 equivalents). The temperature of the solution was reduced to 5° C. and held there while adding dropwise over a 1 hour period, 62 gm of ethylene glycol (2 equivalents). The reaction was monitored using HPLC and analysis indicated the hydroxy isocyanate composition. The solution was stirred for 3 hours at 5° C. followed by dropwise addition to a solution of 100 gm of NaOH and 900 ml H₂O. The resulting solution was then treated as in Example II to yield a product having a molecular weight of 210 by mass spectroscopy and gel permeation chromatography and the following properties obtained by wet chemical analysis for the amino aromatic isocyanate were:

|  | Actual | Based on Proposed Structure |
|---|---|---|
| Total Amine MEQ/gm | 4.93 | 4.80 |
| Hydroxyl Number | 512 | 534 |

EXAMPLE IV

Preparation of Hydroxy Aromatic Isocyanate Using Polyether Triol

To the equipment described in Example I was added 174 gm of 20/80 isomer mixture of 2,4 and 2,6- toluenediisocyanate and 400 ml of tetrahydrofuran. By the procedure outlined in Example I, 369 gm of CAPA-305, a commercially available polycaprolactone triol- (eq wt 152) was added dropwise to form the hydroxy aromatic isocyanate. The reaction product was separated yielding a product which upon addition of a tin polyurethane catalyst produced a plastic with the following properties:

| Shore D | 75 |
|---|---|
| Tensile at break (psi) | 2180 |
| % elongation | 23 |

The above results show that the product contained both isocyanate and hydroxyl group and would polymerize upon addition of catalyst to produce a polymer.

For comparison, the above procedure was repeated reacting toluenediisocyanate with CAPA-305 triol and a tin polyurethane catalyst except that the CAPA-305 triol and catalyst were added simultaneously. The presence of the catalyst effected reaction between all hydroxy and isocyanate groups resulting in the production of a polymer, i.e., oligomers and TDI and polyol. The polymer was analyzed by infrared spectroscopy and NMR there was no residual hydroxy or isocyanate functionality in the system. When the polymer was analyzed, it had the following properties.

| Shore D | 70 |
|---|---|
| Tensile at break (psi) | 1340 |
| % elongation | 23 |

As can be observed from the elementary property analysis of the above polymers. the tensile strength was much less for the polymer system where the components were reacted simultaneously rather than formed in steps via the formation of the intermediate urethane linked hydroxyisocyanate followed by polymerization. Although neither of the polymers tested here appear to have commercial utility, the data do show that there is a difference in the intermediates produced and then reacted to form the elastomers. It is the ability to utilize the multifunctional properties of the urethane-linked hydroxy isocyanates (intermediate) in combination with other systems that is advantageous because it permits one to vary reactants in producing polyurethane/urea elastomers.

EXAMPLE V

Preparation of Hydroxy Aromatic Isocyanate Using TDI and PTMG

To the equipment described in Example I was added 87.0 gm of 20/80 mixed isomer toluenediisocyanate and 400 ml of tetrahydrofuran. By the procedure outline in Example I, 337.5 gm of Teracol 650, a commercially available polyoxytetramethylene glycol-eq wt. 337.5, was added at 5° C., and worked up in a manner similar to Example 1 yielding a product which upon heating and/or addition of a tin polyurethane catalyst produced a plastic with a Shore A-60 and Shore D-20.

EXAMPLE VI

Preparation of polyurethanes

To show the adaptability or utility of the urethane linked hydroxy aromatic compositions in the production of elastomer blends, intermediates from Example I and V were polymerized, at various reactant levels using a tin polymerization catalyst. Mixtures of products from Examples I and V, upon heating produced elastomers with the following shore hardness.

| 23 parts Ex. #I | Shore A - 94 |
|---|---|
| 37 parts Ex. #V | Shore D - 50 |
| 14.6 parts Ex. #I | Shore A - 81 |
| 45.0 parts Ex. #V | Shore D - 37 |
| 8.1 parts Ex. #I | Shore A - 65 |
| 51.9 parts Ex. #V | Shore D - 25 |

The above results show that each urethane linked hydroxy aromatic isocyanate was interpolymerizable with other compounds as well as polymerizable with itself and that the properties of the resulting elastomers were influenced by the concentration of the individual hydroxy aromatic isocyanate composition in the blend.

Example VII

Preparation of Polyurethanes from TDI and Various Polyols

Several urethane linked hydroxy aromatic isocyanates were prepared in accordance with the general procedure of Example 1. On completion of reaction, the products were recovered either by extraction with hexane or distillation of solvent. A portion of each resulting product then was polymerized. The reaction components conditions and results are reported in Table I.

TABLE I

| Run | Reaction Component | Properties | Use |
|---|---|---|---|
| 1 | TDI + 1,4-Butanediol | Shore D - 85 | Brittle Plastic Extendable at 100° C. |
| 2 | TDI + Tetraethylene glycol | Shore D - 75 | Brittle Plastic Extendable at 100° C. |
| 3 | TDI-Polycaprolacetone | Shore D - 70 | Stiff elastomer at R.T Strong elastomer at 100° C. Adhesion: Wood to Wood Glass to Aluminum |
| 4 | TDI-polypropyleneglycol Eq. wt. - 210.5 | Shore A - 50 | Very soft elastomer |
| 5 | TDI + polytetramethyleneglycol Eq. wt. - 335 | Shore D - 20 | Soft rubbery elastomer |
| 6 | TDI + polytetramethyleneglycol (Teracol 650) 21.0% Hard Segment | Shore D - 20 Shore A - 60 Soft Rubbery elastomer | |
| 7 | TDI + T650 TDI + 1.4-Butanediol 30% Hard segment | Shore D - 25 Shore A - 65 Soft, Rubbery elastomer | |
| 8 | TDI + T650 TDI + 1,4-Butanediol 40% Hard segment | Shore D - 37 Shore A - 87 Strong resilient elastomer | |
| 9 | TDI + T650 TDI + 1,4-Butanediol 50% Hard segment | Shore D - 50 Shore A - 94 Strong, stiff elastomer | |

The above results show that the hydroxy aromatic isocyanate may be prepared from a variety of polyols having multiple functionality and differing molecular weights. When 2 or more hydroxyaromatic isocyanates are interpolymerized as in Runs 7-9, properties of the elastomer vary as one might expect. This shows flexibility of the hydroxy aromatic isocyanate to produce elastomers of varying properties.

EXAMPLE VIII

Toluenediisocyanate-1,2-butanediol-Effect of Reactant Ratio

To a clean, dry reaction flask equipped with a mechanical stirrer, thermometer, dropping funnel heating/cooling jacket and nitrogen purge, were added variable isomer mixtures of 2,4- and 2,6-toluenediisocyanate. A portion of 1,2-butanediol was added slowly over a two-hour period thereby providing various NCO/OH mole ratios. The temperature was maintained from 20°–40° C. with constant agitation and by adjusting flow of water through the jacket. After all of the butanediol had been added, the reaction mixture was stirred for eight hours to ensure reaction. The product was recovered by distilling at 100° C. and 0.1 mm Hg in a wiped film apparatus to remove unreacted toluenediisocyanate. Dimer and oligomer content (area) were obtained from HPLC analysis. The oligomer content (calc) was also calculated from the isocyanate concentration assuming the oligomer to be the 3 TDI/2 diol adduct, although other adducts were possible. The available isocyanate content was measured by ASTM method D2572-80. The formula below was used to calculate % oligomer. The calculations show most of the oligomer was the 3:2 adduct. ULTDI refers to a urethane linked toluenediisocyanate, i.e., the 2:1 adduct of TDI and BDO.

% oligomer = ((Eq Wt NCO/%NCO) − Eq WT ULTDI))/(Eq Wt Olig − Eq Wt ULTDI.)

TABLE II

| Mole Excess TDI | ULTDI 2,4-/2,6-TDI | % NCO | Softening Point | % ULTDI (area) | % Oligomers (area) | % ULTDI (calc.) | % Oligomers (calc.) |
|---|---|---|---|---|---|---|---|
| 50% | 64.2/35.8 | 17.34% | 44° C. | 75.27 | 24.73 | 82.47 | 17.53 |
| 100% | 74.6/25.4 | 18.01% | 39° C. | 92.64 | 7.63 | 89.33 | 10.67 |
| 200% | 77.6/22.4 | 18.67% | 37° C. | 98.01 | 1.99 | 95.61 | 4.39 |
| 300% | 79.9/20.1 | 19.01% | 32° C. | 98.43 | 1.57 | 98.24 | 1.76 |

From Table II it can be seen that only dimers and oligomers were formed at the 2°–40° C. reaction temperature associated with the eight hour reaction period. The reaction did not terminate with the hydroxyaromatic intermediate but continued to react and form the dimer and polymer.

The above table shows that at reaction temperatures of 60°–80° C. for the times stated, dimers and trimers were produced. The reaction product did not contain free hydroxyl groups. This is apparent from separation data which show recovery of unreacted toluenediisocyanate at 100° C. If free hydroxyl were present, as is present in the urethane linked hydroxy isocyanate, the product would have polymerized to a resin in the distillation pot.

What is claimed is:

1. A process for producing a urethane linked hydroxy aromatic isocyanate which comprises of steps:
   (a) contacting an aromatic diisocyanate of the formula

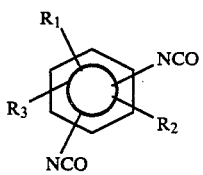

wherein
$R_1$ is $C_{1-6}$ aliphatic. $C_{1-6}$ aliphatic ether or $C_{1-6}$ carboxylic acid aster;
$R_2$ and $R_3$ are hydrogen, $C_{1-6}$ aliphatic, $C_2$–$C_6$ olefinic, $C_{1-6}$ carboxylic acid ester, $C_{1-6}$ aliphatic ether, nutrile halogen and;
   (b) an aliphatic polyol;
maintaining a temperature and for a time sufficient to effect reaction between a first isocyanate group of said aromatic isocyanate with a first hydroxy group of said aliphatic polyol thereby forming a urethane link, but insufficient for effecting reaction between the terminal hydroxyl group of the reacted polyol with another isocyanate group; and,
isolating the reaction product from the reaction medium.

2. The process of claim 1 wherein said temperature of the reaction is from about −25° C. to about 30° C.

3. The process of claim 2 wherein the temperature range is from about 5° C. to 20° C. and the equivalents of isocyanate of said aromatic diisocyanate equivalents to equivalents of hydroxyl group in said aliphatic polyol charged for reaction is from 0.8–1.2 to 1 and the reaction time is from about 15 minutes to 3 hours.

4. The process of claim 3 wherein $R_1$ is $C_1$ methyl and $R_2$ and $R_3$ are hydrogen.

5. The process of claim 3 wherein $R_1$ is $C_1$ methyl $R_2$ is tert-butyl and $R_3$ is hydrogen.

6. The process of claim 4 wherein said aliphatic polyol is a $C_2$–$C_6$ aliphatic diol.

7. The process of claim 6 wherein aliphatic diol is ethylene glycol.

8. The process of claim 6 wherein said polyol is propylene glycol.

9. The process of claim 6 wherein said polyol is butane diol.

10. The process of claim 4 wherein said aliphatic polyol is a polyether polyol.

11. The process of claim 10 wherein the molecular weight of said polyether polyol is from 150 to 1000.

12. The process of claim 11 wherein said polyether polyol is polytetramethylene glycol, polyethylene glycol, polypropylene glycol or polycaprolactone.

13. A urethane linked hydroxy aromatic isocyanate represented by the formula:

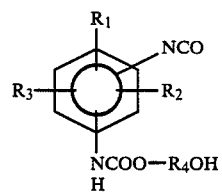

$R_1$ is $C_{1-6}$ aliphatic, $C_{1-6}$ aliphatic ether or $C_{1-6}$ carboxylic acid ester;
$R_2$ and $R_3$ are hydrogen, $C_{1-6}$ aliphatic, $C_2$–$C_6$ olefinic, $C_{1-6}$ carboxylic acid ester, $C_{1-6}$ aliphatic ether, nitrile and halogen and
$R_4$ is the residue of an aliphatic polyol.

14. The composition of claim 13 where $R_1$ is $C_1$ methyl.

15. The composition of claim 14 wherein $R_2$ and $R_3$ are hydrogen.

16. The composition of claim 14 wherein $R_2$ and $R_3$ are $C_2$ ethyl.

17. The composition of claim 14 wherein $R_2$ is tert-butyl and ortho to an isocyanate group.

18. The composition of claim 15 wherein $R_4$ is the residue of a $C_{2-6}$ aliphatic diol.

19. The composition of claim 18 wherein $R_4$ is $C_2$ the residue of ethylene glycol.

20. The composition of claim 18 wherein $R_4$ is the residue of propylene glycol.

21. The composition of claim 18 wherein $R_4$ is the residue of butane diol.

22. The composition of claim 15 wherein said aliphatic polyol is a polyether polyol.

23. The composition of claim 22 wherein said polyether polyol has a molecular weight from 150 to 1000.

24. The composition of claim 23 wherein the polyether polyol is polytetramethylene glycol, polycaprolactone, polypropylene glycol, or polyethylene glycol.

* * * * *